United States Patent
Kim et al.

(10) Patent No.: US 8,180,005 B2
(45) Date of Patent: May 15, 2012

(54) APPARATUS AND METHOD FOR SELECTING OPTIMAL SIGNAL USING AUXILIARY EQUALIZATION IN DIVERSITY RECEIVER

(75) Inventors: Ju-Yeun Kim, Daegu (KR); Young-Su Kim, Daejon (KR); Jae-Hwui Bae, Daejon (KR); Hyun Lee, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 878 days.

(21) Appl. No.: 12/096,641

(22) PCT Filed: Nov. 7, 2006

(86) PCT No.: PCT/KR2006/004626

§ 371 (c)(1),
(2), (4) Date: Jun. 9, 2008

(87) PCT Pub. No.: WO2007/066904

PCT Pub. Date: Jun. 14, 2007

(65) Prior Publication Data

US 2008/0291336 A1  Nov. 27, 2008

(30) Foreign Application Priority Data

Dec. 9, 2005  (KR) .................. 10-2005-0120699
Apr. 5, 2006  (KR) .................. 10-2006-0030938

(51) Int. Cl.
*H04B 7/10* (2006.01)

(52) U.S. Cl. ........ 375/347; 375/260; 375/267; 375/299; 375/346; 375/348; 375/349

(58) Field of Classification Search .................. 375/347, 375/260, 267, 299, 346, 348, 349
See application file for complete search history.

(56) References Cited

U.S. PATENT DOCUMENTS

| 5,703,905 | A  | * | 12/1997 | Langberg ...................... 375/232 |
| 2002/0163593 | A1 | * | 11/2002 | Liu et al. ...................... 348/614 |
| 2003/0093809 | A1 | * | 5/2003 | Shu et al. ...................... 725/111 |

FOREIGN PATENT DOCUMENTS

| EP | 1 331 782 | 7/2003 |
| KR | 1020020018501 | 3/2002 |
| KR | 1020020049358 | 6/2002 |
| KR | 1020030092109 | 12/2003 |
| KR | 1020040027210 | 4/2004 |
| KR | 100583240 | 5/2006 |
| WO | 2004/049595 | 6/2004 |

* cited by examiner

*Primary Examiner* — Kabir A Timory
(74) *Attorney, Agent, or Firm* — Ladas & Parry LLP

(57) ABSTRACT

Provided are an apparatus and method for selecting an optimal signal using auxiliary equalization in a diversity receiver. The optimal signal selecting apparatus includes: a plurality of sync recovery units for extracting sync information from baseband signals, which are candidate signals, except a baseband signal selected as a current optimal signal a plurality of auxiliary equalizers for channel-equalizing the candidate signals based on the extracted sync information; a plurality of SNR measuring units for measuring signal-to-noise ratios (SNRs) of the candidate signals inputted to the auxiliary equalizers and the candidates signals equalized in the auxiliary equalizers; and an optimal signal selector for selecting an optimal candidate signal from the candidate signals by using the extracted sync information and the measured SNRs, and replacing the optimal signal with the optimal candidate signal when reception quality of the current optimal signal is poor.

13 Claims, 6 Drawing Sheets

[Fig. 1]
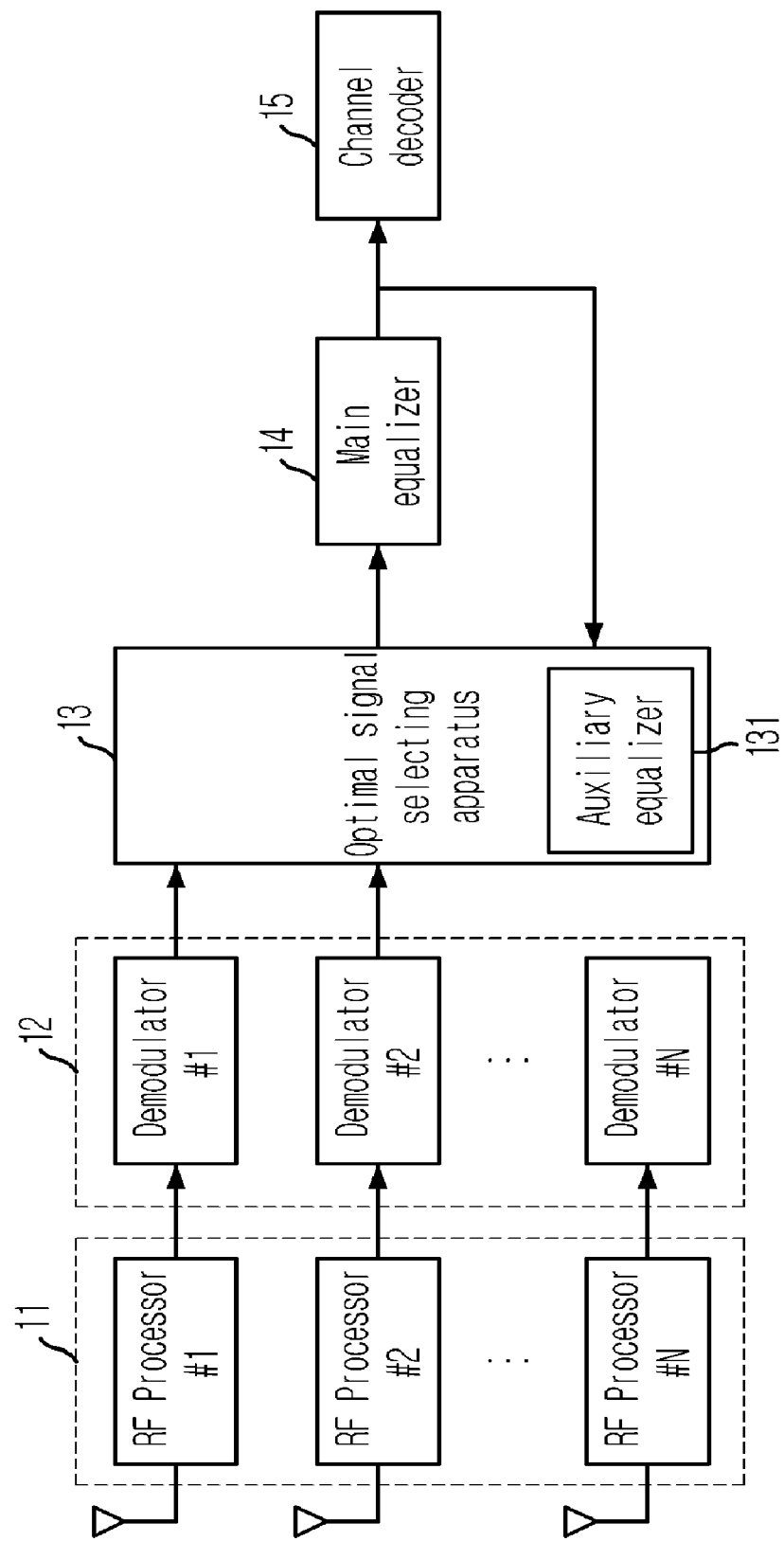

[Fig. 2]
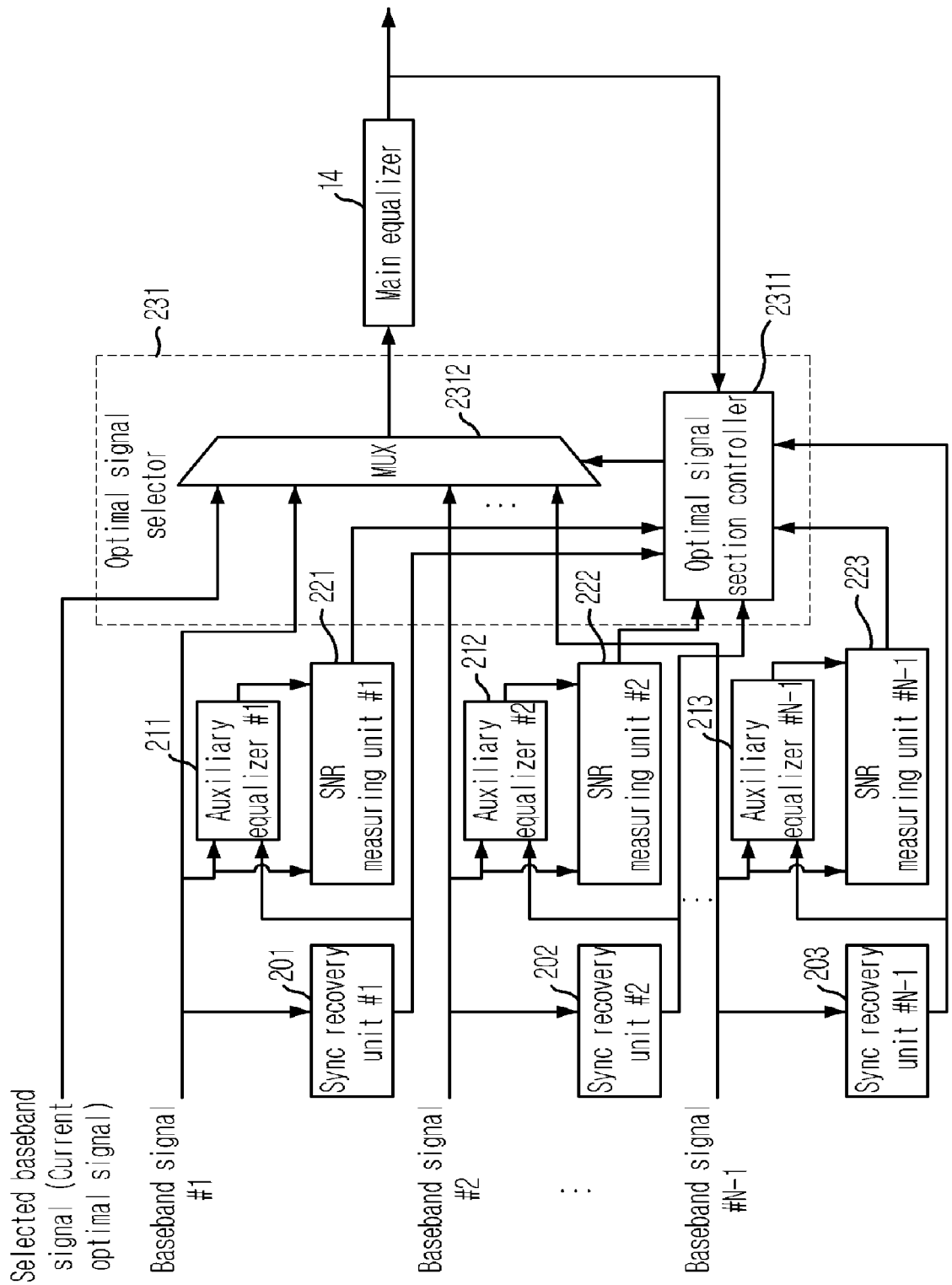

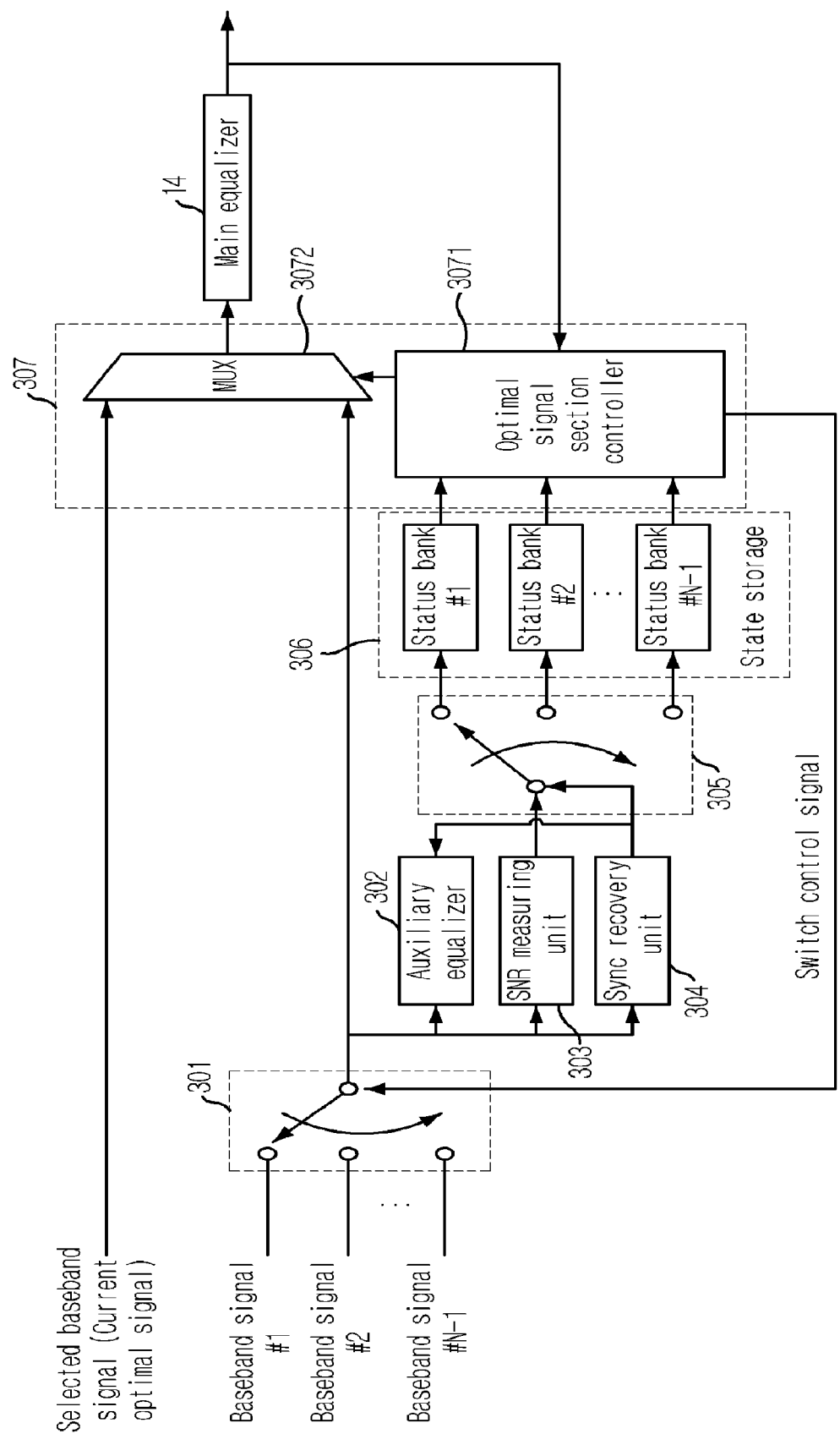
[Fig. 3]

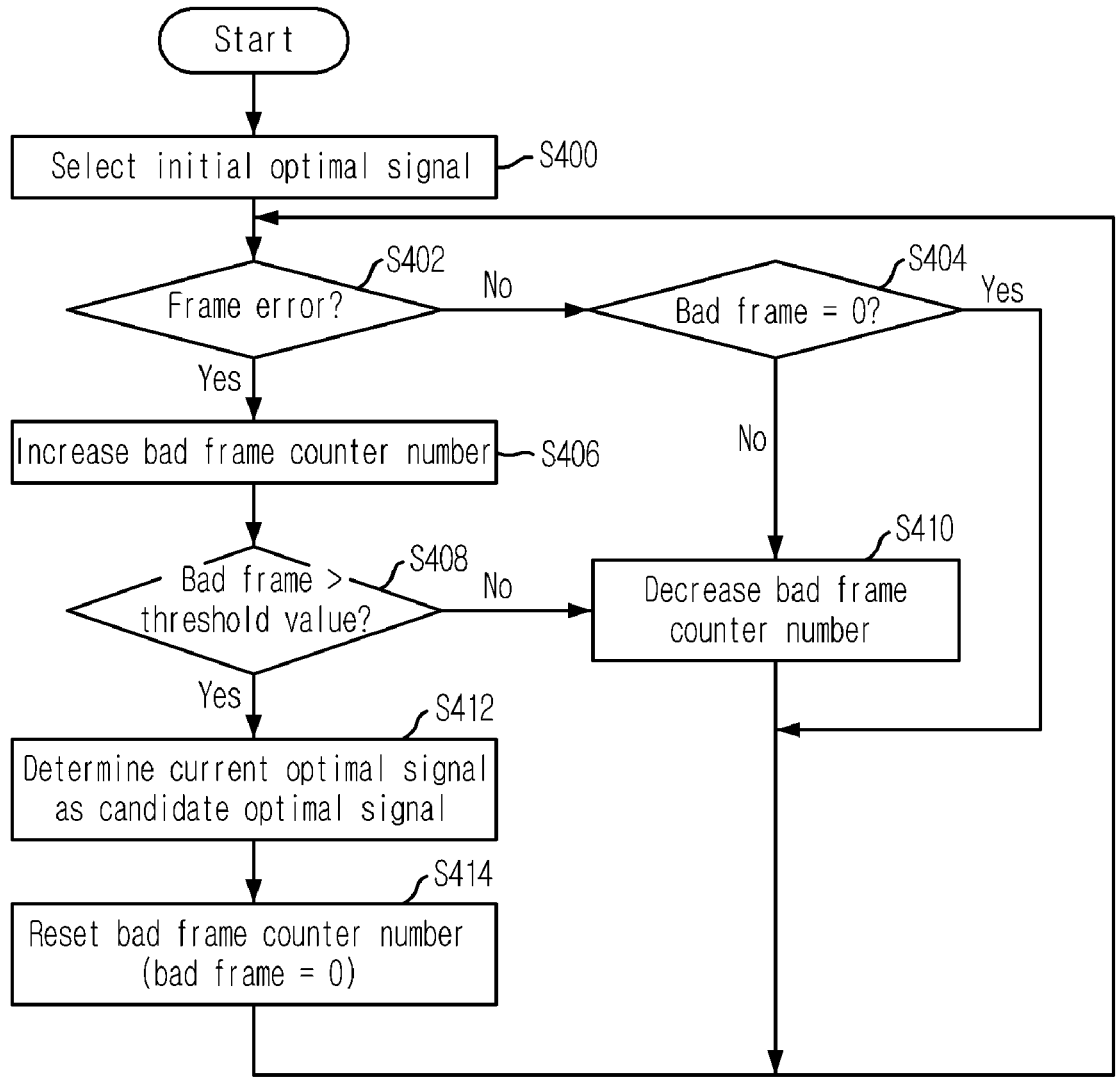

[Fig. 5]
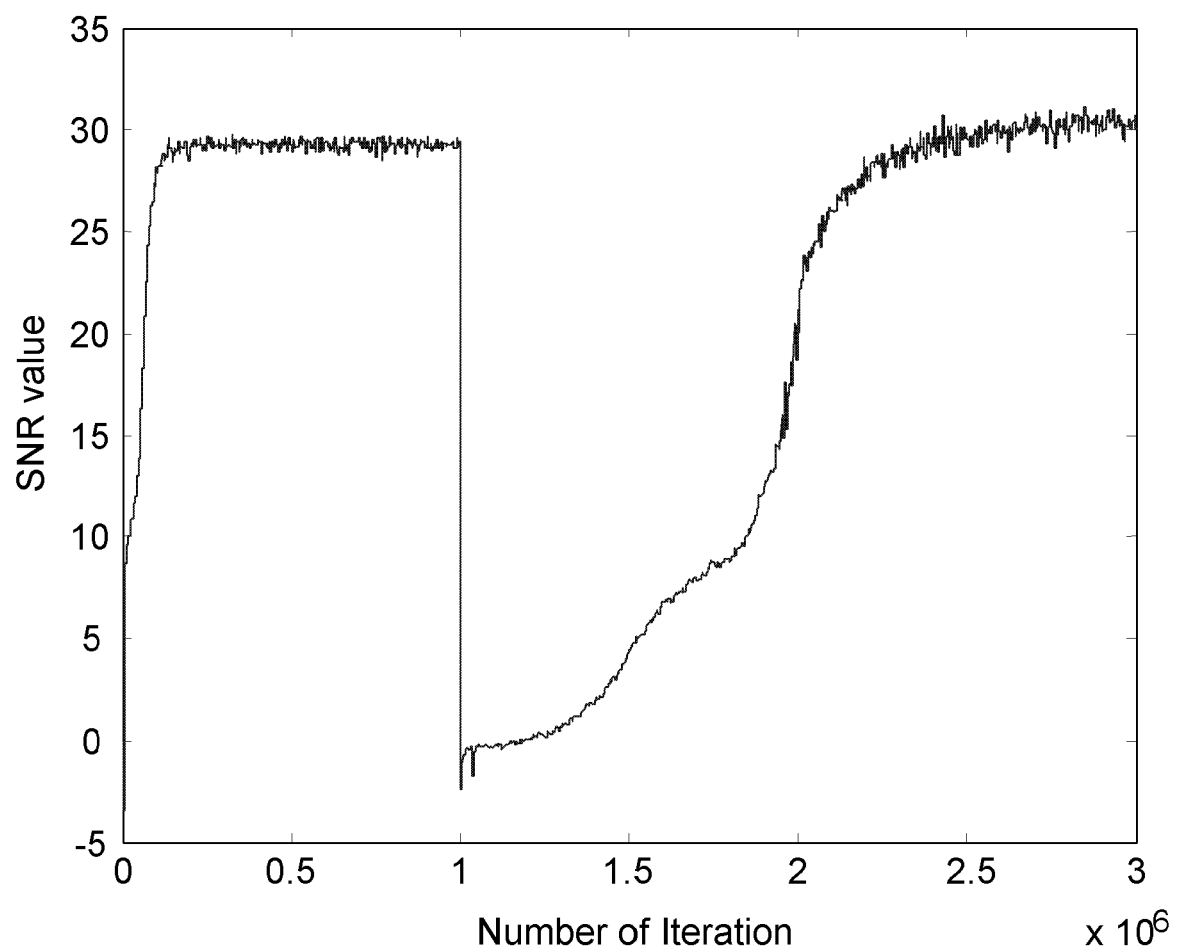

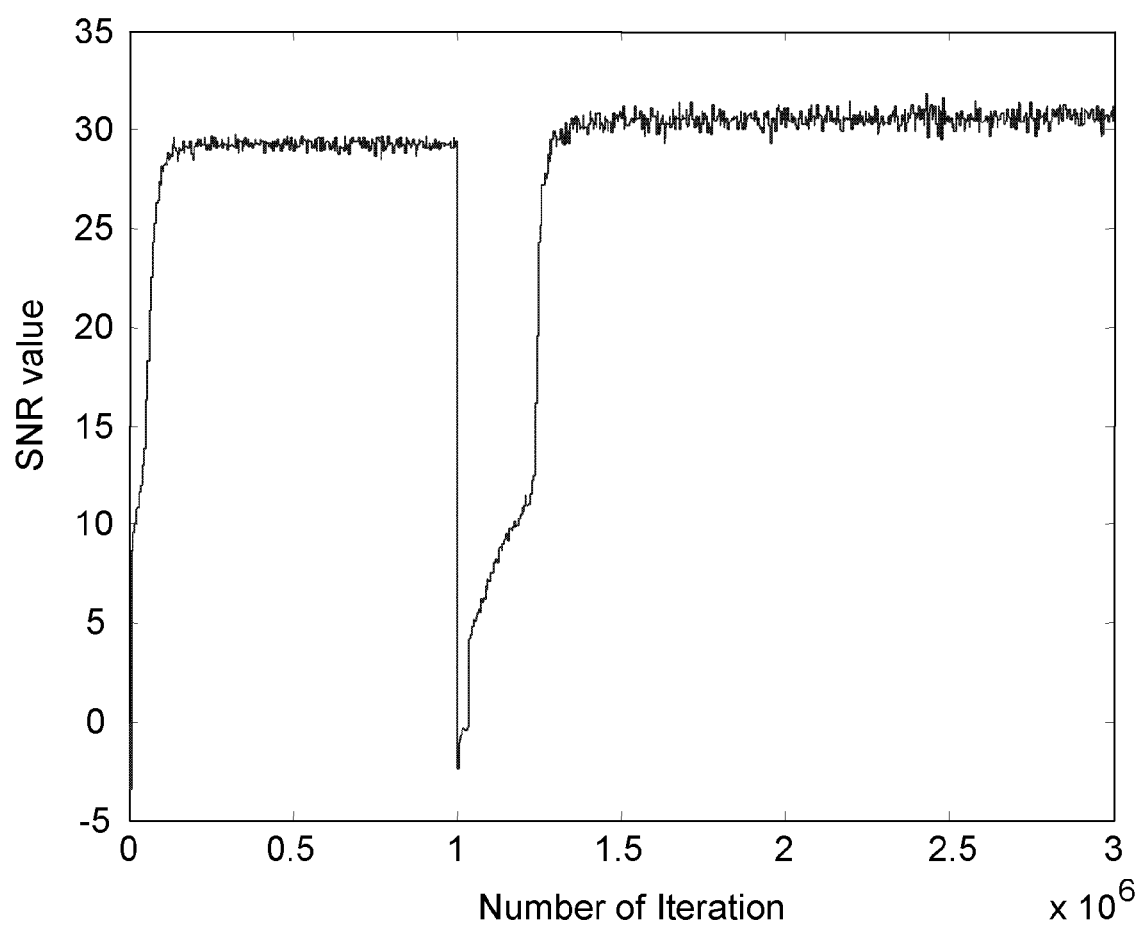
[Fig. 6]

APPARATUS AND METHOD FOR SELECTING OPTIMAL SIGNAL USING AUXILIARY EQUALIZATION IN DIVERSITY RECEIVER

TECHNICAL FIELD

The present invention relates to an apparatus and method for selecting an optimal signal using auxiliary equalization in a diversity receiver; and, more particularly, to an optimal signal selecting apparatus using auxiliary equalization in a diversity receiver, in which the diversity receiver performs an auxiliary equalization on baseband signals prior to selection of an optimal signal among a plurality of baseband signals, and selects an optimal baseband signal, considering the result of the auxiliary equalization, thereby improving the digital television (DTV) reception performance in a mobile reception environment.

BACKGROUND ART

In Advanced Television Systems Committee (ATSC) 8-VSB receiver, many efforts have been made to improve the performance of an RF front end and a synchronization and channel equalizer in association with a fixed reception (RX) channel. However, the performance of a fixed-channel receiver is greatly degraded by introduction of multipath waves in a dynamic multipath channel such as a mobile RX channel.

Therefore, the development of the diversity receiver having the improved mobile reception performance of the ATSC 8-VSB receiver is essential for a single frequency network system as well as a multi frequency network. For this purpose, signal selection schemes for obtaining an optimal single demodulation signal in a multi demodulator must be continuously studied.

That is, the selection of the optimal single demodulation signal is very important in the diversity receiver used for improving the mobile reception performance of the ATSC 8-VSB.

The ideal method for selecting a candidate signal having the optimal reception performance is to demodulate, equalize and channel-decode all RX signals and select an optimal baseband signal from the processed RX signals. However, because this method uses N separate receivers, its implementation is complex.

According to the related art, an optimal signal is selected using strength of the diversity antenna output signal power or information on channel response characteristic. However, because the method using the intensity of the RX signal power selects the optimal signal without considering the channel response characteristic, the performance of the DTV receiver is not greatly improved.

Meanwhile, an optimal signal can be selected according to signal-to-noise ratio (SNR) by measuring channel response characteristic. This method selects an optimal signal by calculating correlation values of a RX signal and a training sequence. That is, this method selects a signal having highest channel improvement in the receiver side.

The two conventional methods are applied to the diversity multi-demodulation receiver using a single equalizer. However, when the channel changes abruptly, an image cut-off phenomenon may be caused by a field sync signal and a re-convergence of an equalizer.

Therefore, there is a demand for an optimal signal selecting algorithm that can obtain high reception performance from a plurality of baseband signals received through a diversity antenna, and a receiver using the same.

DISCLOSURE OF INVENTION

Technical Problem

It is, therefore, an object of the present invention to provide an apparatus and method for selecting an optimal signal using auxiliary equalization in a diversity receiver, in which the diversity receiver performs an auxiliary equalization on baseband signals prior to selection of an optimal signal among the baseband signals, and selects an optimal baseband signal, considering the result of the auxiliary equalization, thereby improving the digital television (DTV) reception performance in a mobile reception environment.

Technical Solution

In accordance with one aspect of the present invention, there is provided an optimal signal selecting apparatus using auxiliary equalization in a diversity receiver, including: a plurality of sync recovery units for extracting sync information from all baseband signals, which are candidate signals, except a baseband signal selected as a current optimal signal a plurality of auxiliary equalizers for channel-equalizing the candidate signals based on the extracted sync information; a plurality of SNR measuring units for measuring signal-to-noise ratios (SNRs) of the candidate signals inputted to the auxiliary equalizers and the candidate signals equalized in the auxiliary equalizers; and an optimal signal selector for selecting an optimal candidate signal from the candidate signals by using the extracted sync information and the measured SNRs, and replacing the optimal signal with the optimal candidate signal when reception quality of the current optimal signal is poor.

In accordance with another aspect of the present invention, there is provided an optimal signal selecting apparatus using auxiliary equalization in a diversity receiver, including: a switch for individually receiving baseband signals, which are candidate signals, except a baseband signal selected as a current optimal signal; a sync recovery unit for extracting sync information from the candidate signals inputted by the switch; an auxiliary equalizer for channel-equalizing the inputted candidate signals based on the extracted sync information; an SNR measuring unit for measuring SNRs of the inputted candidate signals and the channel-equalized candidate signals; a status bank for storing the measured SNRs and the extracted sync information; and an optimal signal selector for controlling the switch to receive the candidate signals individually, selecting an optimal candidate signal from the candidate signals by using the sync information and the SNRs stored in the status bank, and replacing the optimal signal with the optimal candidate signal when reception quality of the current optimal signal is poor.

In accordance with another aspect of the present invention, there is provided an optimal signal selecting method using auxiliary equalization in a diversity receiver, including the steps of: a) selecting one of baseband signals as an initial optimal signal; b) extracting sync information from baseband signals, which are candidate signals, except the baseband signal selected as the current optimal signal c) channel-equalizing the candidate signals based on the extracted sync information; d) measuring SNRs of the candidate signals before and after the step c); e) selecting an optimal candidate signal from the candidate signals by using the extracted sync information and the measured SNRs; and f) when reception quality of the current optimal signal is poor, replacing the current optimal signal with the optimal candidate signal.

Advantageous Effects

According to the present invention, the performance of the DTV receiver can be improved by selecting the reliable beam, that is, the optimal baseband signal, in the mobile reception and indoor reception environment.

In addition, the optimal baseband signal can be selected using the information on the sync signal and the SNR at the I/O terminal of the auxiliary terminal. The main equalizer of the receiver can rapidly compensate for the channel distortion even in the abrupt channel change environment, thereby preventing the image cut-off phenomenon.

BRIEF DESCRIPTION OF THE DRAWINGS

The above and other objects and features of the present invention will become apparent from the following description of the preferred embodiments given in conjunction with the accompanying drawings, in which:

FIG. 1 is a block diagram of a diversity receiver using an auxiliary equalizer in accordance with an embodiment of the present invention;

FIG. 2 is a block diagram of an optimal signal selecting apparatus using a plurality of auxiliary equalizers in accordance with a first embodiment of the present invention;

FIG. 3 is a block diagram of an optimal signal selecting apparatus using a single auxiliary equalizer in accordance with a second embodiment of the present invention;

FIG. 4 is a flowchart illustrating a method for selecting an optimal signal in the optimal signal selecting apparatus in accordance with an embodiment of the present invention;

FIG. 5 is a graph of a reception performance when equalization coefficients of a main equalizer is reset in channel change; and FIG. 6 is a graph of a reception performance when an equalization coefficient of a pre-selected optimal candidate signal is set as equalization coefficients of a main equalizer in channel change.

BEST MODE FOR CARRYING OUT THE INVENTION

Other objects and aspects of the invention will become apparent from the following description of the embodiments with reference to the accompanying drawings, which is set forth hereinafter.

FIG. 1 is a block diagram of a diversity receiver using an auxiliary equalizer in accordance with an embodiment of the present invention. Specifically, a diversity multi-demodulation receiver using an auxiliary equalizer is illustrated in FIG. 1.

Referring to FIG. 1, the reason why a diversity receiver 11 uses an auxiliary equalizer 131 to select an optimal signal is that an SNR value of a baseband signal at an input terminal of a main equalizer 14 is not proportional to an SNR value calculated after equalization.

For example, when SNR of an A signal and a B signal at a baseband terminal are 10 dB and 5 dB, respectively, the two signals will have SNR lower than a threshold of visibility (TOV) if a distorted signal is not compensated by a main equalizer 14. Consequently, it is impossible to obtain clearly recovered image signals.

When the two signals pass through the main equalizer and channel distortion is compensated, the SNR of the B signal is often higher than the SNR of the A signal at the output terminal of the equalizer. This phenomenon is associated with the equalization and the magnitude of nonlinear noise generated during the synchronization recovery. The nonlinear noise includes a carrier phase noise and a timing phase jitter.

It is assumed in the above-described example that the A signal has the nonlinear noise of 10 dB and no intersymbol interference (ISI), and the B signal has a small nonlinear noise and the ISI of 5 dB. In this case, even after the signals pass through the channel equalizer, the SNR of the A signal is 10 dB, while the B signal is 20 dB, which is higher than the TOV, because of the removal of the ISI.

Because this situation can occur frequently, the mere quantitative compensation of the SNR in the baseband terminal is not suitable as the condition for the selection of the optimal signal.

Therefore, in accordance with the present invention, the optimal baseband signal is selected using the sync information of the each baseband signal and the SNR of each baseband signal previously equalized through the auxiliary equalizer 131.

First, an diversity receiver 11 will be described below. Each diversity antenna receives an RX signal entering at a predefined angle and transmits the received signal to each tuner. Each tuner down-converts a signal corresponding to a desired channel into an IF band. N RX signals are saw-filtered and properly amplified, and then are converted into digital signals by a quantization process. These processes are carried out in the RF processors of the diversity receiver 11.

Then, N digital signals (IF signals) are down-converted into baseband signals by N digital demodulators 12. At this point, the symbol timing recovery and the carrier recovery are carried out. When the N the demodulators 12 perform the demodulation process to generate the N baseband signals, an optimal signal selecting apparatus 13 selects an optimal baseband signal from the N baseband signals and transmits the selected optimal baseband signal to the main equalizer 14. The optimal signal selecting apparatus 13 uses the simple auxiliary equalizers 131 to select the optimal signal, as illustrated in FIG. 1.

The selected optimal baseband signal is equalized in the main equalizer 14 and is channel-decoded by a channel decoder 15. A decision feedback equalizer (DFE) may be used as the auxiliary equalizer 131 of the optimal signal selecting apparatus 13 and the main equalizer 14.

FIG. 2 is a block diagram of an optimal signal selecting apparatus using a plurality of auxiliary equalizers in accordance with a first embodiment of the present invention. Specifically, an auxiliary equalizer is provided at each subchannel. Hereinafter, the optimal signal selecting apparatus and method will be described in detail with reference to FIG. 4.

The optimal signal selecting apparatus in accordance with the present invention performs a function of selecting an optimal candidate signal from N−1 baseband signals (see FIG. 2) and a function of determining whether to maintain a current optimal signal as the optimal signal or replace the optimal signal with the optimal candidate signal according to the status of the baseband signal selected as the current optimal signal (see FIG. 4). The process of selecting the optimal candidate signal will be described below with reference to FIG. 2.

In FIG. 2, the N−1 inputted baseband signals, which are candidate signals, means the remaining baseband signals except one baseband signal selected as a current optimal signal.

Sync recovery units 201 to 203 extract sync information from the N−1 baseband signals, and SNR measuring units 221 to 223 measure SNRs at front/rear ends of auxiliary equalizers 211 to 213, respectively. The optimal signal selecting apparatus 13 selects the optimal candidate signal using the sync information and the SNR information. Then, the optimal signal selecting apparatus 13 determines whether to replace the current optimal baseband signal with the optimal candidate signal by using SNRs obtained after the current selected baseband signal is channel-equalized through the main equalizer 14 (see FIG. 4). Through these procedures, the optimal baseband signal is selected from the N baseband signals.

The sync recovery units 201 to 203 extract the sync information from the inputted N−1 baseband signals. The SNR measuring units 221 to 223 measure the SNRs of the baseband signals inputted to the auxiliary equalizers 211 to 213 and the SNRs of the baseband signals outputted from the auxiliary equalizers 211 to 213. That is, the SNR measuring units 221 to 223 measure the SNRs before and after the auxiliary equalization. More specifically, the SNRs of the baseband signals are calculated at each field by using difference between a PN sequence value inserted into a field sync interval and an ideal PN sequence value.

The N−1 auxiliary equalizers 211 to 213 receive the extracted sync information and the baseband signals and performs the channel equalization process. The channel-equalized baseband signals are received in a high quality than those that are not channel-equalized.

The SNR measuring units 221 to 223 calculate the SNRs of the channel-equalized baseband signals and transfer the calculated SNRs to an optimal signal selection controller 2311 of an optimal signal selector 231.

The optimal signal selector 231 includes the optimal signal selection controller 2311 and a multiplexer 2312. Also, in selecting the optimal baseband signal, the optimal signal selector 231 uses the SNRs calculated after the equalization of the auxiliary equalizers. Therefore, when the optimal signal selected by the optimal signal selector 231 is inputted to the main equalizer and the channel decoder of the receiver, the probability for obtaining signals for a clear image quality will increase.

In other words, the optimal signal selection controller 2311 selects the optimal candidate signal at each field by using the sync information and the I/O SNR information of the auxiliary equalizer, and replaces the optimal signal with the optimal candidate signal according to the status of the current optimal signal. The status of the current optimal signal can be known from the output SNR of the main equalizer 14. That is, when the quality of the current optimal signal is poor, the optimal signal selection controller 2311 replaces the optimal signal with the optimal candidate signal. This process is achieved by controlling the multiplexer 2312. Because the principle of selecting the optimal candidate signal is basically identical to the principle illustrated in FIG. 3, it will be described in detail with reference to FIG. 3.

Referring to FIGS. 2 and 3, it is assumed that a specific baseband signal is selected as the optimal signal in an initial step, and the optimal candidate signal is selected using the sync information and the SNRs of the remaining baseband signals. At this point, an arbitrary signal among the N baseband signals may be selected as the initial optimal signal. Also, when the statuses of the baseband signals are pre-checked, a signal of the best status may be selected as the initial optimal signal.

Meanwhile, the optimal signal selecting apparatus of FIG. 2 individually performs the pre-equalization process, the sync information extracting process, and the SNR measuring process. Therefore, it is necessary to implement N sync recovery units, N auxiliary equalizers, and N SNR measuring units. Consequently, the optimal signal selecting apparatus of FIG. 2 has a complicated system structure.

A following description will be made on a method for acquiring channel equalization information of each subchannel through a time division scheme using a single auxiliary equalizer.

FIG. 3 is a block diagram of an optimal signal selecting apparatus using a single auxiliary equalizer in accordance with a second embodiment of the present invention. Specifically, the optimal signal selecting apparatus uses a single auxiliary equalizer based on the time division scheme. Also, an optimal signal selecting method using the single auxiliary equalizer will also be described together.

Referring to FIG. 3, the optimal signal selecting apparatus includes switches 301 and 305, an auxiliary equalizer 302, an SNR measuring unit 303, a sync recovery unit 304, a status storage 306, and an optimal signal selector 307. The optimal signal selector 307 includes an optimal signal selection controller 3071 and a multiplexer 3072. The switch 301 and the switch 305 are operated under control of the optimal signal selection controller 3071. The switch 301 is switched to sequentially and individually input N−1 baseband signals to the auxiliary equalizer 302, the SNR measuring unit 303, and the sync recovery unit 304, or to input a baseband signal selected as an optimal candidate signal to the multiplexer 3072. The switch 305 is switched to transfer SNRs and sync signal of the baseband signals to the status banks of the status storage 306. The SNRs and the sync signal are stored in the status banks of the status storage 306.

In this embodiment, the optimal signal selecting apparatus performs a function of selecting an optimal candidate signal from the N−1 baseband signals (see FIG. 3) and a function of determining whether to replace the optimal signal with the optimal candidate signal according to the status of a currently selected baseband signal (see FIG. 4). The process of selecting the optimal candidate signal will be described below with reference to FIG. 3.

Referring to FIG. 3, the N−1 subchannel signals, which are baseband signals, except a selected diversity output signal, which is a baseband signal, is equalized by the single auxiliary equalizer on the basis of the time division scheme. The sync information of each baseband signal and the SNRs calculated before and after the equalization are stored. Then, an optimal candidate signal is selected from the N−1 baseband signals by using the sync information and the SNRs.

The optimal signal selecting apparatus monitors the status bank of each subchannel at each frame, and selects a baseband signal group having a sync signal matching with a currently selected signal. When a plurality of baseband signals have the same sync signal, a signal having a high auxiliary equalizer output SNR is selected as the optimal candidate signal. In addition, when more than two signals have the same output SNR, a signal having a high auxiliary equalizer input SNR is selected as the optimal candidate signal.

In the optimal signal selecting apparatus, the conditions used to select the optimal candidate signal have the priorities as follows: i) whether the corresponding signal has the same sync signal as the baseband signal selected as the optimal signal; ii) the output SNR of the auxiliary equalizer; and iii) the input SNR of the auxiliary equalizer.

FIG. 4 is a flowchart of an optimal signal selecting method using the optimal signal selecting apparatus in accordance with an embodiment of the present invention. Specifically, FIG. 4 is a flowchart illustrating a process of determining whether to maintain a current optimal signal or replace the optimal signal with an optimal candidate signal according to the status of the baseband signal selected as the optimal signal. This process is carried out in the optimal signal selection controllers 2311 and 3071.

In step S400, the optimal signal selection controllers 2311 and 3071 select an initial optimal signal. An arbitrary signal among a plurality of the baseband signals may be selected as the initial optimal signal. Alternatively, a signal having the best status may be selected as the initial optimal signal after checking. If the optimal signal selecting apparatus is operating, it is not always necessary to select the optimal signal at the beginning. Once the process of selecting the initial optimal signal is finished, the optimal signal selecting apparatus iterates the loop of i) selecting an optimal candidate signal (see FIGS. 2 and 3) and ii) determining whether to replace the current optimal signal with the optimal candidate signal (see FIG. 4).

In step S402, it is determined whether an error exists in a frame of the baseband signal selected as the current optimal signal. That is, the quality of the baseband signal selected as the current optimal signal and inputted to the rear end of the receiver is verified. In other words, the quality of the received signal is verified by checking whether the output SNR of the equalizer (14 in FIGS. 2 and 3) is greater than a threshold value set by the user, or by checking how many segment error of the current optimal signal inputted to the main equalizer occurs in a current field.

When no frame error exists, that is, when the received signal can be clearly recovered, a count value of a bad frame decreases. When the count value of a current bad frame is zero in step S404, it is neglected because it cannot decrease any more. Then, the process maintains a standby status until a next field or frame begins.

When the frame error exists, that is, when the main equalizer 14 cannot compensate the channel distortion because of a poor reception status of a current signal, or when the segment error occurs greater than the threshold value within one field, the current received frame is determined as a bad frame and the count value of the bad frame increases by 1 in step 406.

In step 408, it is determined whether the count value of the bad frame is greater than the threshold value. If the poor reception status occurs for a long time, the count value of the bad frame continues to increase and, if not, another baseband signal (optimal candidate signal) is selected as a new optimal signal. At this point, the user can adjust the duration of the poor reception status through a process of setting the threshold value of the count value of the bad frame.

When the count value of the bad frame is less than the threshold value in step 408, the count value of the bad frame decreases by 1 in step 410. Then, the process returns to step 402.

On the other hand, when the count value of the bad frame is greater than the threshold value in step 408, the current optimal signal is replaced with the optimal candidate signal by using information of the optimal candidate signal and sync information thereof in step 412. Then, the count value of the bad frame is reset in step 414. From a next frame on, the new baseband signal is inputted to the main equalizer 14, and the rear end of the receiver receives signals through a new channel.

In other words, the optimal signal selecting apparatus determines the quality of the baseband signal selected as the current optimal signal by using the count value of the bad frame. The result is expressed using the increase/decrease of the count value. When the count value reaches a predetermined threshold value, the optimal candidate signal preset at each frame or field is inputted to the main equalizer 14. The optimal signal selecting apparatus provides the newly selected optimal signal and the corresponding sync signal to the main equalizer 14 together. In addition, a previously converged equalization coefficient of the auxiliary equalizer is used as an equalization coefficient of the main equalizer. Through these procedures, channel distortion of the main equalizer 14 is rapidly compensated and seamless image signals can be obtained from the final output of the channel decoder.

FIG. 5 is a graph of the reception performance when the equalization coefficient of the main equalizer is reset in channel change, that is, when the current optimal signal is replaced with the optimal candidate signal. FIG. 6 is a graph of the reception performance when the auxiliary equalization coefficient of the optimal candidate signal is set as the main equalization coefficient in channel change.

It is assumed in FIGS. 5 and 6 that an A channel is selected as the current optimal signal and a C channel is selected as the optimal candidate signal. When the optimal signal changes from the A channel to the C channel, the equalizer output SNRs according to the equalization coefficient are illustrated.

Referring to FIG. 5, when the channel abruptly changes after 1106 symbols, the SNR gradually increases while the reset main equalizer begins to equalize the C channel, which is the newly selected optimal signal. In this case, the channel can be equalized, but it is impossible to prevent the image cut-off when the rapid convergence is difficult.

Referring to FIG. 6, the equalization coefficient of the selected optimal candidate signal is set as the initial value of the main equalizer. In this case, when the equalizer output is deteriorated due to the channel change, the auxiliary equalization coefficient previously updated by the auxiliary equalizer selected according to a given condition is used as the initial value of the main equalizer, that is, the equalization coefficient of the main equalizer. Therefore, the main equalizer can be rapidly converged by providing useful information for the optimal signal selection through the simple auxiliary equalizer.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2005-0120699 and 2006-0030938, filed with the Korean Intellectual Property Office on Dec. 9, 2005, and Apr. 5, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An optimal signal selecting apparatus using auxiliary equalization in a diversity receiver, comprising:
    a plurality of sync recovery units for extracting sync information from baseband signals, which are candidate signals, except a baseband signal selected as a current optimal signal;
    a plurality of auxiliary equalizers for channel-equalizing the candidate signals based on the extracted sync information;
    a plurality of SNR measuring units for measuring signal-to-noise ratios (SNRs) of the candidate signals inputted to the auxiliary equalizers and the candidate signals equalized in the auxiliary equalizers;

an optimal signal selector for selecting an optimal candidate signal from the candidate signals by using the extracted sync information and the measured SNRs, and replacing the current optimal signal with the optimal candidate signal when reception quality of the current optimal signal is poor, wherein the optimal candidate signal is selected according to priorities: i) whether a current optional signal and a sync signal are the same; ii) output SNR of the auxiliary equalizer; and iii) input SNR of the auxiliary equalizer; and a main equalizer for equalizing the optimal candidate signal selected by the optimal signal selector.

2. The optimal signal selecting apparatus of claim 1, wherein the reception quality of the current optimal signal at the optimal signal selector is evaluated based on the SNR of the current optimal signal channel distortion-equalized by the main equalizer, or the number of segment errors per field of a current optimal signal inputted to the main equalizer.

3. The optimal signal selecting apparatus according to claim 1, wherein the optimal signal selector selects an arbitrary signal as an initial optimal signal among a plurality of baseband signals, or selects the initial optimal signal after checking status of the baseband signals.

4. The optimal signal selecting apparatus according to claim 1, wherein when the current optimal signal is replaced by the optimal candidate signal, the optimal signal selector provides an auxiliary equalization coefficient of the optimal candidate signal as an equalization coefficients of the main equalizer.

5. The optimal signal selecting apparatus according to claim 1, wherein the optimal signal selector performs a process of selecting an optimal candidate signal and a process of changing an optimal signal based on frame or field.

6. An optimal signal selecting apparatus using auxiliary equalization in a diversity receiver, comprising:

a switch for individually receiving baseband signals, which are candidate signals, except a baseband signal selected as a current optimal signal;

a sync recovery unit for extracting sync information from the candidate signals inputted by the switch;

an auxiliary equalizer for channel distortion-equalizing the inputted candidate signals based on the extracted sync information;

an SNR measuring unit for measuring SNRs of the inputted candidate signals and the channel-equalized candidate signals;

a status bank for storing the measured SNRs and the extracted sync information;

an optimal signal selector for controlling the switch to individually receive the candidate signals, selecting an optimal candidate signal from the candidate signals based on the sync information and the SNRs stored in the status bank, and replacing the current optimal signal with an optimal candidate signal when reception quality of the current optimal signal is poor, and wherein the optimal candidate signal is selected according to priorities: i) whether a current optimal signal and a sync signal are the same; ii) output SNR of the auxiliary equalizer; and iii) input SNR of the auxiliary equalizer; and a main equalizer for equalizing the optimal candidate signal selected by the optimal signal selector.

7. The optimal signal selecting apparatus of claim 6, wherein the reception quality of the current optimal signal at the optimal signal selector is evaluated based on the SNR of the current optimal signal channel-equalized by a main equalizer, or a number of segment errors per field of the current optimal signal inputted to the main equalizer.

8. The optimal signal selecting apparatus according to claim 6, wherein the optimal signal selector selects an arbitrary signal as an initial optimal signal among a plurality of baseband signals, or selects the initial optimal signal after checking statuses of the baseband signals.

9. The optimal signal selecting apparatus according to claim 6, wherein when the current optimal signal is replaced by the optimal candidate signal, the optimal signal selector provides an auxiliary equalization coefficient of the optimal candidate signal as an equalization coefficient of the main equalizer.

10. The optimal signal selecting apparatus according to claim 6, wherein the optimal signal selector performs a process of selecting an optimal candidate signal and a process of changing an optimal signal based on frame or field.

11. An optimal signal selecting method using auxiliary equalization in a diversity receiver, comprising the steps of:

a) selecting one of baseband signals as a current optimal signal, and wherein an arbitrary signal among the baseband signals is selected as an initial optimal signal, or the initial optimal signal is selected after checking statuses of the baseband signals;

b) extracting sync information from baseband signals, which are candidate signals, except the baseband signal selected as the current optimal signal;

c) channel-equalizing the candidate signals based on the extracted sync information;

d) measuring SNRs of the candidate signals before and after the step c);

e) selecting an optimal candidate signal from the candidate signals based on the extracted sync information and the measured SNRs;

f) when reception quality of the current optimal signal is poor, replacing the current optimal signal with an optimal candidate signal, and wherein the optimal candidate signal is selected according to priorities: i) whether a current optimal signal and a sync signal are the same; ii) output SNR of the auxiliary equalizer; and iii) input SNR of the auxiliary equalizer; and g) equalizing the optimal candidate signal.

12. The optimal signal selecting method according to claim 11, further comprising the step of providing an auxiliary equalization coefficient of the optimal candidate signal as an equalization coefficient of a main equalizer when the optimal signal is replaced with the optimal candidate signal in the step f).

13. The optimal signal selecting method according to claim 11, wherein reception quality of the current optimal signal in the step f) is evaluated based on the SNR of the current optimal signal channel-equalized by the main equalizer, or the number of segment errors per field of the current optimal signal inputted to the main equalizer.

* * * * *